United States Patent [19]

Miller et al.

[11] Patent Number: 4,738,771

[45] Date of Patent: Apr. 19, 1988

[54] HYDROCARBON UPGRADING PROCESS

[75] Inventors: J. Wayne Miller; John W. Ward, both of Yorba Linda, Calif.

[73] Assignee: Union Oil Company of California, Los Angeles, Calif.

[21] Appl. No.: 817,351

[22] Filed: Jan. 9, 1986

Related U.S. Application Data

[62] Division of Ser. No. 680,348, Dec. 11, 1984, Pat. No. 4,582,819.

[51] Int. Cl.$^4$ ............................................. C10G 35/06
[52] U.S. Cl. ..................... 208/135; 208/141; 208/143; 585/410; 585/418; 585/480; 585/721; 585/730
[58] Field of Search ............... 208/135, 134, 296, 141, 208/143; 502/348, 346, 345, 347; 585/480, 418, 410, 721, 730

[56] References Cited

U.S. PATENT DOCUMENTS

| | | | |
|---|---|---|---|
| 1,515,733 | 11/1924 | Cross | 208/247 |
| 1,687,992 | 10/1928 | Phillips et al. | 208/245 |
| 1,760,585 | 5/1930 | Cross | 208/245 |
| 1,947,776 | 2/1934 | Huff et al. | 423/230 |
| 2,064,999 | 12/1936 | Watson | 208/249 |
| 2,755,226 | 7/1956 | Annable et al. | 208/248 |
| 2,768,932 | 10/1956 | Richard et al. | 208/246 |
| 2,769,764 | 11/1956 | Annable | 208/248 |
| 2,897,142 | 7/1959 | Jacobs et al. | 208/212 |
| 2,917,452 | 12/1959 | Brooke et al. | 208/91 |
| 3,595,920 | 7/1971 | Ellis et al. | 502/346 |
| 3,617,518 | 11/1971 | Sinfelt et al. | 208/134 |
| 4,008,174 | 2/1977 | Jacobson et al. | 252/411 |
| 4,049,542 | 9/1977 | Gibson et al. | 208/213 |
| 4,113,606 | 9/1978 | Mulaskey | 208/244 |
| 4,163,708 | 8/1979 | Jacobson et al. | 208/89 |
| 4,171,285 | 10/1979 | Mulaskey | 252/455 |
| 4,188,285 | 2/1980 | Michlmayr | 208/246 |
| 4,204,947 | 5/1980 | Jacobson et al. | 208/243 |
| 4,224,191 | 9/1980 | Bishop, III | 252/463 |
| 4,259,976 | 4/1981 | Gould | 44/53 |
| 4,320,240 | 3/1982 | Love et al. | 208/134 |
| 4,388,225 | 6/1983 | Solomon | 502/346 |
| 4,539,101 | 9/1985 | Oleck et al. | 208/254 |
| 4,582,819 | 4/1986 | Miller et al. | 502/415 |
| 4,585,751 | 4/1986 | Kukes et al. | 208/296 |

Primary Examiner—Helen M. S. Sneed
Assistant Examiner—Anthony McFarlane
Attorney, Agent, or Firm—Dean Sandford; Gregory F. Wirzbicki; Alan H. Thompson

[57] ABSTRACT

A novel catalytic absorbent composition is prepared with a synthetic copper or silver carbonate-containing material. The absorbent is useful for removing hydrogen sulfide and mercaptan sulfur from hydrocarbon oils, especially from feedstreams to a reformer.

16 Claims, No Drawings

HYDROCARBON UPGRADING PROCESS

This application is a division of application Ser. No. 680,348, filed 12-11-84, now U.S. Pat. No. 4,582,819.

BACKGROUND OF THE INVENTION

1. Field of the Invention

This invention relates to a catalytic absorbent composition, its preparation, and use for desulfurizing hydrocarbon oils, and most particularly to the use of the composition for desulfurizing reformer feedstocks.

2. Description of the Prior Art

Catalysts containing sulfur-sensitive Group VIII metal components are often employed in petroleum refining processes such as hydrocracking, synthesis gas processing, methanation, reforming, steam reforming, hydrogenation, and the like. Such catalysts lose their catalytic activity and stability due to deleterious effects of sulfur during processing. In a typical reforming process treating a straight run naphtha or cracked naphtha, the feedstock is upgraded (as by increasing the octane number of the gasoline fraction) by contact with a catalyst comprising a noble metal on alumina. Conditions utilized in reforming processes vary depending upon such factors as the type of feed processed and the desired increase in octane level.

To achieve maximum run lengths and increase process efficiency, it is generally recognized that the sulfur content of the feedstock must be minimized. Reforming catalysts, and particularly those comprising platinum, and even more particularly comprising platinum and rhenium, deactivate rapidly and are even poisoned in the presence of sulfur compounds. As a result, it is necessary to reduce the sulfur content of reformer feedstocks as low as possible. Preferably, feedstocks contacted with reforming catalysts are desulfurized to contain less than about 0.5 ppmw sulfur.

A common method of treating reformer feeds to reduce the sulfur content is by hydrodesulfurization wherein a naphtha or other hydrocarbon feedstock is contacted with a sulfur-tolerant hydrogenation catalyst in the presence of hydrogen. Although good sulfur removal may be achieved by hydrodesulfurization units operating under severe conditions, the efficiency of such processes is ultimately limited by equilibrium and/or kinetic considerations. In many instances, it is not possible to obtain hydrodesulfurized products containing less than 0.1 ppmw sulfur as desired in most reforming operations. Furthermore, it is impossible to guard against occasional upsets in the hydrodesulfurization unit which can result in higher than desired levels of organosulfur compounds remaining in the reformer feedstock.

In addition to hydrodesulfurization, there are other processes employing catalytically active materials for removing sulfur from hydrocarbons. Such processes reduce the sulfur content of the hydrocarbon by "absorbing" sulfur therefrom and generally employ a catalytically active absorbent material under nonhydrogenative conditions. Typically, nonhydrogenative conditions include contact of the absorbent material with the feedstock in the absence of hydrogen; however, if desired, hydrogen is sometimes present, but only in amounts or under conditions that prevent essentially any hydrogenation of the organosulfur components in the feedstock. Usually, the absorbent material contains a metal component, such a nickel, copper, or silver, and the feedstocks generally treated are reformer feedstocks, particularly naphthas. Typical of such processes include that disclosed in U.S. Pat. No. 2,755,226 to Annable wherein a bed of copper molybdate pellets is utilized to reduce the sulfur content of naphthas. Similarly, in U.S. Pat. No. 4,224,191 to Bishop III, the use of copper components supported in conventional carriers is disclosed for reducing the sulfur content of reformer feedstreams. However, the search continues for catalytically active absorbent materials which are more active and which have more capacity for the absorption of sulfur than the materials of the prior art.

Accordingly, it is an object of the present invention to provide a novel composition useful for desulfurizing hydrocarbon oils.

It is a further object of the present invention to provide a method for preparing a composition useful for desulfurizing hydrocarbon oils.

Another object of the present invention is to provide a process for upgrading a hydrocarbon oil by contact with a novel composition of the present invention.

These and other objects and advantages of the invention will become apparent from the following description.

SUMMARY OF THE INVENTION

The present invention relates to a novel catalytic composition prepared with a synthetic copper or silver carbonate-containing material and to a process utilizing such a catalytic composition for upgrading a hydrocarbon oil. In one embodiment, a catalytic absorbent composition is prepared by admixing a precursor of a refractory oxide support with a synthetic copper or silver carbonate compound that is prepared from a soluble copper or silver compound and a soluble carbonate compound. In a preferred embodiment, a catalytic absorbent composition is prepared with alumina and a synthetic basic copper(II) carbonate [$CuCO_3Cu(OH)_2$] and utilized to remove sulfur, especially hydrogen sulfide and mercaptan sulfur, from a hydrocarbon reformer feedstock.

DETAILED DESCRIPTION OF THE INVENTION

The present invention relates to a composition prepared with a material containing a "synthetic" copper or silver carbonate compound. A "synthetic" copper or silver carbonate used herein is prepared from copper or silver salts, and not obtained from a silver or copper carbonate-containing material found in nature.

It will be understood that the "catalytic absorbent" referred to herein, although useful for removing sulfur from hydrocarbon oils, may also, in certain processes, function as a catalyst for promoting hydrocarbon conversion reactions.

It will be further understood that, although the term "catalytic absorbent" or "catalytic sorbent" is used herein to describe the material of the present invention with which the hydrocarbon oils are contacted, and the term "absorbed" is used to describe the mechanism by which the sulfur is held thereon, the invention embraces whatever mechanism, including adsorption, absorption, deposition, chemical reactions, etc., or some combinations of such mechanisms, by which the sulfur is removed from the hydrocarbon oil and retained by the catalytic absorbent. Also, the terms "sulfur" and "organosulfur compounds" are used interchangeably herein and are intended to include sulfur in whatever form, elemental or combined, it may be present.

A catalytic absorbent of the invention comprises synthetically-derived copper or silver metal components composited with a porous refractory oxide. The copper or silver components are usually present in the catalytic absorbent from about 1 to about 75, preferably about 5 to about 30, and most preferably about 10 to about 20 weight percent, calculated as the metal. Preferred catalytic absorbents comprise copper components with an alumina-containing refractory oxide support. Copper oxide, derived from a synthetically prepared basic copper(II) carbonate-containing material and composited on a porous refractory oxide containing gamma alumina, is the most preferred catalytic absorbent.

Numerous porous refractory oxides may be utilized to support the metal components. Representative of such supports include alumina, silica, silica-alumina, zirconia, silica-zirconia, titania, and magnesia, and combinations thereof. However, the preferred support is alumina, most preferably gamma alumina having a surface area above about 100 $m^2$/gm, with the most preferred surface areas being between 150 and 400 $m^2$/gm. The refractory oxide usually comprises at least about 25 weight percent and preferably at least about 35 weight percent of the catalytic absorbent.

Synthetic copper and silver carbonate-containing compounds used in preparing catalytic absorbent compositions of the invention are typically produced from the reaction of a copper or silver salt combined with a carbonate-containing material or a precursor thereof. For example, an aqueous solution of a copper or silver salt may be combined with a soluble carbonate compound to produce a copper or silver carbonate-containing precipitate which is separated, washed, and dried. Another typical preparation includes the step of bubbling carbon dioxide ($CO_2$) gas into a solution of copper or silver salt.

A preferred synthetic carbonate-containing compound is basic copper(II) carbonate [$CuCO_3Cu(OH)_2$] that is ordinarily prepared by combining a soluble copper salt such as copper(II) nitrate [$Cu(NO_3)_2$] with a soluble carbonate solution, such as an alkali carbonate, i.e., sodium carbonate (soda ash), potassium carbonate, and the like.

An unusual feature of the synthetic copper or silver carbonate-containing material used in the preparation of the catalytic absorbent is the sulfur content. The synthetic carbonate-containing material ordinarily contains less than about 0.2, preferably less than about 0.1, and most preferably less than 0.05 weight percent of sulfur, calculated as S. Furthermore, the atom ratio of sulfur to copper or sulfur to silver metal in the synthetic carbonate-containing material is usually less than about 0.007, preferably less than about 0.005, and most preferably less than 0.002. As set forth hereinafter in Example I, catalytic absorbents of the invention, prepared with synthetic copper carbonate-containing materials having less than 0.2 weight percent of sulfur and a sulfur to metal atom ratio less than 0.007, demonstrate superior sulfur-absorbing activity and capacity as compared to catalytic absorbents prepared with a copper carbonate-containing compound obtained from nature and having greater than 0.2 weight percent of sulfur and a sulfur to copper ratio greater than 0.007.

A method by which the copper or silver metal components may be composited with the refractory oxide is comulling. In comulling, the precursors of the refractory oxide support material are admixed with precursors of the active metal components, either in solid form or in solution, to produce a paste suitable for shaping by known methods, e.g., pelleting, extrusion, etc. For instance, a precursor of a refractory oxide may be admixed with a synthetic copper or silver carbonate-containing material along with sufficient liquid, such as water, until an extrudable paste is formed. More particularly, an alumina powder, such as boehmite, is comulled with a synthetic basic copper(II) carbonate-containing material in the presence of sufficient water to create a paste extrudable through a die. Ordinarily, the precursor of the porous refractory oxide is not peptized.

Composites of the synthetic copper or silver carbonate-containing material and refractory oxide prepared by a foregoing method or an obvious equivalent are dried and then calcined at temperatures greater than about 500° F., preferably between 600° and 1000° F., and yield a catalytic absorbent containing the active metals in their respective oxide forms.

A catalytic absorbent of the invention has a maximum cross-sectional dimension of the particle from about 1/40 to about ¼ inch, and preferably about 1/32 to about 1/6 inch. Although the particles may have either a symmetrical or unsymmetrical cross-sectional shape, it is preferred the particles have a symmetrical cross-sectional shape, such as a cylindrical or polylobal shape.

Physical characteristics of the catalytic absorbent include a surface area generally greater than about 100 $m^2$/gram, and preferably from about 200 $m^2$/gram to about 400 $m^2$/gram, as determined by the B.E.T. method. The total pore volume of the absorbent is usually about 0.3 to about 0.8 cc/gram, as determined by conventional mercury porosimetry techniques. The compacted bulk density (CBD) of the absorbent is usually in the range from about 0.4 to about 0.9 grams/cc.

An unusual feature of the invention is that, in comparison to catalytic absorbents containing copper or silver metal components prepared from non-synthetic carbonate compounds, the catalytic absorbent of the invention is substantially more active for removing sulfur compounds from a hydrocarbon oil. The synthetic copper and silver carbonate compounds used in the preparation of the absorbent, therefore, substantially enhance the activity of the absorbent for absorbing sulfur compounds. In comparison to a similar catalytic absorbent containing no synthetic copper or silver carbonate compounds, the catalytic absorbent of the invention exhibits at least 25 percent greater, and ofen more than 50 percent greater capacity for absorbing sulfur as the comparison absorbent. Thus, when reformer feeds and the like are treated for sulfur removal, the catalytic absorbent of the invention, due to its increased activity and capacity for absorbing sulfur, is useful for maintaining a low total sulfur concentration in the product, usually below 0.5 ppmw and preferably less than 0.2 ppmw of hydrogen sulfide and mercaptan sulfur, for a time period substantially in excess of that possible with similarly prepared catalytic absorbents but containing no metals derived from synthetic copper or silver carbonate compounds.

Another unusual property of the catalytic absorbent of the invention is its sulfur-absorbing capacity under conditions of elevated temperature. The sulfur-absorbing capacity of the absorbent, as determined in weight of absorbed sulfur per weight of fresh catalytic absorbent, is substantially greater at a higher temperature.

The absorbent of the invention exhibits more than a 25 percent increase in capacity as a result of an increase in the operating temperature by 100° F. and, as shown hereinafter in Example II, the absorbent exhibits more than 100 percent increase at the higher temperature.

After a catalytic absorbent of desired chemical and physical characteristics is prepared, it is usually employed as either a fixed, slurried or fluidized bed of particulates in a suitable reactor vessel wherein a hydrocarbon oil to be treated is introduced and subjected to conditions of elevated pressure and elevated temperature and, in the case of hydroprocessing, also subjected to a hydrogen partial pressure. The absorbent is preferably used in the absence of added hydrogen.

The catalytic absorbent may be employed in any of several hydrocarbon conversion processes. Typical processes include dehydrogenation, desulfurization, hydrodesulfurization, oxidation, denitrogenation, demetallization, isomerization, cracking, hydrocracking, reforming, and the like.

The term "hydrocarbon conversion" is intended to include all reactions wherein hydrocarbons change physical or chemical composition. The hydrocarbons include all forms, such as aliphatic, cycloaliphatic, olefinic, aromatic- including alkaryl and arylalkyl aromatic compounds, in addition to organometallic, organonitrogen, and organosulfur compounds, particularly those found in conventional hydrocarbon oils.

The conditions employed to upgrade a hydrocarbon oil will vary widely depending upon the process in which the absorbent is used and the nature of the oil. Most usually, the catalytic absorbent is maintained as a fixed bed with the feedstock passing downwardly therethrough, and the reactor is generally operated under conditions including a temperature from about 50° F. to about 1000° F., preferably about 250° F. to about 450° F., a pressure from atmospheric to about 3,000 p.s.i.g., preferably about 100 to about 2,500 p.s.i.g., and a space velocity of about 0.05 to about 25, preferably about 3 to about 15 LHSV. During hydroprocessing, the hydrogen recycle rate is usually about 1,000 to about 15,000, and preferably about 3,000 to about 10,000 standard cubic feet per barrel (scf/bbl).

The absorbent of the invention is particularly effective for desulfurization reactions, and especially for treating sulfur-containing hydrocarbons to be fed to a reaction vessel having a Group VIII metal-containing catalyst that promotes hydrocarbon conversion reactions such as hydrocracking, methanation, reforming, steam reforming, hydrogenation, including aromatic saturation, and synthesis gas processing. Hydrocarbon feedstocks often contain sulfur, largely in the form of organosulfur compounds, such as mercaptans, disulfides, and the like. The organosulfur compounds are usually present in a total concentration greater than 5 ppmw, and often in a concentration in excess of 10 ppmw, calculated as S. The absorbent is highly effective for removing sulfur in the form of hydrogen sulfide and mercaptan sulfur.

Contemplated for treatment by the process employing the composition of the invention are hydrocarbon-containing oils, herein referred to generally as "oils," including broadly all liquid, gaseous, and liquid/gaseous hydrocarbon mixtures such as crude petroleum oils and synthetic crudes. Among the typical oils contemplated are distillate hydrocarbon fractions derived from petroleum, shale oil, liquid coal, oils from bituminous sands, and other synthetic or natural sources. Examples of oils include solvent naphthas, kerosene, diesel fuels, jet fuels, aromatics, heavy naphthas, light naphthas, cycle oils from cracking operations, coker distillates, cracked gasoline, lubricating oils, waxes, vacuum fractions, decant oils, reformer feeds, and the like. It is preferred that the oils contain sulfur components, such as organosulfur components and hydrogen sulfide, and particularly those oils in which the organosulfur compounds comprise mercaptans.

The absorbent is highly suitable for treating reformer feedstocks to be subjected to catalytic reforming over a platinum or platinum-rhenium reforming catalyst or other metal-containing reforming catalyst that deactivates upon contact with sulfur. Such feedstocks usually contain above about 0.1 ppmw mercaptan sulfur and boil in the range of 150° to 450° F. A preferred reformer feedstock is a naphtha containing hydrogen sulfide and organosulfur compounds essentially completely in the form of mercaptans. Such a feedstock preferably contains between 0.1 and 20 ppmw sulfur in mercaptan form and hydrogen sulfide.

In accordance with a highly preferred process of the invention for removing sulfur from a hydrocarbon oil, an oil containing less than about 10 ppmw of hydrogen sulfide and mercaptan sulfur is contacted with the catalytic absorbent in a suitable reactor vessel under conditions of elevated temperature, preferably between 100° and 600° F., and most preferably between about 200° and 450° F., of elevated pressure, preferably about 100 to about 600 p.s.i.g., and at a space velocity of about 1 to about 20 LHSV. Preferably, contact of the absorbent with the oil is performed in the absence of hydrogen. However, hydrogen may be present, but preferably only in amounts or under conditions that prevent essentially any sulfur removal from the catalytic absorbent.

The invention is further illustrated by the following examples which are illustrative of specific modes of practicing the invention and are not intended as limiting the scope of the invention defined by the appended claims.

EXAMPLE I

A catalytic absorbent A of the present invention is prepared as follows:

One hundred eighty (180) grams of spray-dried alumina powder (boehmite) are dry-mulled for 40 minutes with 42.1 grams of synthetic basic copper(II) carbonate $[CuCO_3Cu(OH)_2]$ obtained from Shepherd Chemical Company and with 2.0 grams of methylated cellulose (Methocel TM). The synthetic base copper(II) carbonate material has a sulfur content less than about 0.05 weight percent, calculated as S, and a sulfur-to-copper atom ratio less than 0.002. One hundred eighty-eight cubic centimeters (cc) of distilled water are then added and the resultant mixture mulled for another 60 minutes until an extrudable paste is formed. The paste is extruded through a die having an opening resembling the shape of a three-leaf clover. The resultant extrudates, having cross-sections of about 1/16 inch, are dried for 1 hour at 250° F. and calcined for 16 hours at 900° F.

A reference catalytic absorbent B is prepared in the same manner as catalytic absorbent A, except the basic copper(II) carbonate $[CuCO_3Cu(OH)_2]$ is naturally occurring malachite. This basic copper(II) carbonate material is found in nature and has a sulfur content of about 0.23 weight percent, calculated as S, and a sulfur-to-copper atom ratio of 0.008.

After calcination, the resultant catalytic absorbents A and B each have a nominal composition of 15 weight percent copper components, calculated as Cu, and a balance of gamma alumina. The surface area of each catalytic absorbent is about 300 m²/gram.

Each catalytic absorbent is tested as a sulfur absorbent in the following manner: The catalytic absorbent is placed as a fixed bed in a tubular reactor and a hydrocarbon oil containing iso-octane spiked with n-butyl mercaptan to contain 220 ppmw sulfur is passed downwardly through the reactor at a space velocity of 5.0 LHSV, at a temperature of 300° F., and a pressure of 500 p.s.i.g. The reaction is conducted in the absence of additional hydrogen ($H_2$).

Samples of the product are removed from the reactor at 4-hour intervals over a time period of 44 hours and analyzed by appropriate X-ray fluorescence methods to determine their sulfur concentrations. The results of these tests are summarized in TABLE I:

TABLE I

| Time, Hrs | Effluent Sulfur Concentration (ppmw) | |
|---|---|---|
| | Catalytic Absorbent A | Catalytic Absorbent B |
| 4 | <5 | <5 |
| 8 | <5 | 5 |
| 12 | 9 | 23 |
| 16 | 19 | 58 |
| 20 | 31 | 83 |
| 24 | 48 | 105 |
| 28 | 72 | 131 |
| 32 | 79 | 142 |
| 36 | 110 | 153 |
| 40 | 129 | 176 |
| 44 | 153 | — |

As shown, the effluent from the reactor containing catalytic absorbent A of the invention exhibits detectable sulfur after approximately 12 hours, while the effluent from the reactor containing reference catalytic absorbent B exhibits detectable sulfur after only approximately 8 hours. Even after 40 hours, catalytic absorbent A still exhibits absorption of approximately 40 percent of the feedstock sulfur whereas comparative absorbent B only absorbs approximately 20 percent of the sulfur in the feed. Thus, the results indicate that preparing a catalytic absorbent with synthetic basic copper(II) carbonate substantially increases the capacity of the absorbent for removing sulfur in comparison to a similar absorbent prepared with basic copper(II) carbonate obtained from naturally occurring malachite.

EXAMPLE II

Portions of catalytic absorbent A of Example I are tested in four (4) experimental runs for sulfur-absorbing capacity with portions of the same feedstock and at the same conditions as in Example I, except for variation in the temperature.

Experimental runs 1 through 4 are performed at temperatures of 250° F., 300° F., 350° F., and 400° F., respectively. The data is summarized in Table II:

TABLE II

| Run | Temp., °F. | Relative Capacity*, % |
|---|---|---|
| 1 | 250 | ~40 |
| 2 | 300 | 100 |
| 3 | 350 | 170 |
| 4 | 400 | 265 |

*Determined in weight of absorbed sulfur per weight of fresh catalytic absorbent A at 25 percent breakthrough of sulfur in the effluent.

As shown, at sulfur-absorbing conditions including temperatures at 350° F. and 400° F., catalytic absorbent A demonstrates a respective sulfur-absorbing capacity that is 70 and 165 percent greater than that at 300° F. Furthermore, as compared to sulfur-absorbing conditions including a temperature of 250° F., catalytic absorbent A exhibits substantially greater sulfur-absorbing capacity at the conditions of higher temperature.

Although particular embodiments of the invention have been described, it will be understood, of course, that the invention is not limited thereto since many obvious modifications can be made, and it is intended to include within this invention any such modifications as will fall within the scope of the invention as defined by the appended claims.

We claim:

1. A reforming process comprising contacting a hydrocarbon oil under reforming conditions with a catalytic composition consisting essentially of copper oxide or silver oxide and a porous refractory oxide prepared by a method comprising admixing a synthetic copper or silver carbonate-containing material with a porous refractory oxide or precursor thereof, to catalytically promote the production of at least one hydrocarbon reformate product.

2. The process defined in claim 1 wherein said reforming conditions include the presence of added hydrogen.

3. The process defined in claim 1 wherein said catalytic composition has about 5 to about 30 weight percent of copper components, calculated as Cu.

4. The process defined in claim 1 wherein said catalytic composition has a surface area greater than about 100 m²/gram.

5. The process defined in claim 2 wherein said hydrocarbon oil contacts said catalytic composition in the presence of added hydrogen wherein said hydrogen is recycled at a rate of about 1000 to about 15,000 standard cubic feet per barrel.

6. The process defined in claim 1 whereas said porous refractory oxide support comprises gamma alumina.

7. The process defined in claim 1 wherein said synthetic copper carbonate contains basic copper carbonate.

8. The process defined in claim 1 wherein said hydrocarbon oil contains hydrocarbon compounds selected from the group consisting of aliphatic, cycloaliphatic, olefinic and aromatic compounds.

9. The process defined in claim 2 wherein said hydrocarbon oil comprises organosulfur compounds.

10. The process defined in claim 2 wherein said porous refractory oxide support comprises gamma alumina.

11. The process defined in claim 2 wherein said synthetic copper carbonate contains basic copper carbonate.

12. The process defined in claim 1 wherein a dehydrogenation reaction is promoted during said contacting.

13. The process defined in claim 4 wherein isomerization reactions are catalyzed during said contacting.

14. A process comprising aromatic saturation of a hydrocarbon oil, said process comprising contacting said hydrocarbon oil under aromatic saturation conditions including the presence of hydrogen with a composition prepared with a synthetic copper or silver carbonate-containing material to catalytically promote the production of at least one saturated hydrocarbon product, said composition consisting essentially of copper oxide or silver oxide and a porous refractory oxide or precursor thereof.

15. An aromatic saturation process comprising contacting a hydrocarbon oil containing aromatic compounds with a catalytic composition under aromatic saturation conditions including the presence of hydrogen to produce a product hydrocarbon oil containing a greater content of saturated aromatic compounds than said hydrocarbon oil, said catalytic composition consisting essentially of copper oxide or silver oxide and a porous refractory oxide prepared by a method comprising admixing a synthetic basic copper carbonate or silver carbonate having a sulfur content less than about 0.05 weight percent, calculated as S, with said porous refractory oxide or precursor thereof, forming an extrudable paste, shaping said extrudable paste, drying the shaped extrudable paste, and calcining the dried shaped extrudable paste to form said catalytic composition.

16. The process defined in claim 15 wherein said hydrocarbon oil contains alkaryl and arylalkyl aromatic compounds.

* * * * *